(12) United States Patent
An et al.

(10) Patent No.: US 12,682,632 B1
(45) Date of Patent: Jul. 14, 2026

(54) MULTI-DIMENSIONAL FISH SCHOOL PERCEPTION APPARATUS AND METHOD

(71) Applicant: CHINA AGRICULTURAL UNIVERSITY, Beijing (CN)

(72) Inventors: Dong An, Beijing (CN); Yan Meng, Beijing (CN); Jincun Liu, Beijing (CN); Yaoguang Wei, Beijing (CN); Daoliang Li, Beijing (CN)

(73) Assignee: CHINA AGRICULTURAL UNIVERSITY, Beijing (CN)

( * ) Notice: Subject to any disclaimer, the term of this patent is extended or adjusted under 35 U.S.C. 154(b) by 0 days.

(21) Appl. No.: 19/322,758

(22) Filed: Sep. 9, 2025

(30) Foreign Application Priority Data

Jan. 14, 2025 (CN) .......................... 202510056504.3

(51) Int. Cl.
| | |
|---|---|
| *A01K 61/95* | (2017.01) |
| *G06V 10/77* | (2022.01) |
| *G06V 10/80* | (2022.01) |
| *G06V 10/82* | (2022.01) |
| *G06V 20/05* | (2022.01) |
| *H04N 23/695* | (2023.01) |
| *H04N 23/90* | (2023.01) |

(52) U.S. Cl.
CPC .......... *G06V 20/05* (2022.01); *G06V 10/7715* (2022.01); *G06V 10/806* (2022.01); *G06V 10/82* (2022.01); *H04N 23/695* (2023.01); *H04N 23/90* (2023.01)

(58) Field of Classification Search
CPC .. G06V 20/05; G06V 10/7715; G06V 10/806; G06V 10/82; H04N 23/695; H04N 23/90
See application file for complete search history.

(56) References Cited

U.S. PATENT DOCUMENTS

| | | | | |
|---|---|---|---|---|
| 6,038,494 A | * | 3/2000 | Fisher, Jr. ................. | F03B 3/06 |
| | | | | 43/9.6 |
| 2018/0217256 A1 | * | 8/2018 | Stokes ................... | G01K 13/00 |
| 2022/0053744 A1 | * | 2/2022 | Stubbs ................... | A01K 69/10 |
| 2024/0103163 A1 | * | 3/2024 | Wada ..................... | G01S 7/539 |
| 2024/0104900 A1 | * | 3/2024 | Long ................. | G06V 10/7715 |
| 2024/0407342 A1 | * | 12/2024 | Li .......................... | A01K 61/80 |

FOREIGN PATENT DOCUMENTS

| | | |
|---|---|---|
| CN | 116047527 A | 5/2023 |
| CN | 116778310 A | 9/2023 |
| CN | 118365790 A | 7/2024 |

* cited by examiner

*Primary Examiner* — Gims S Philippe
(74) *Attorney, Agent, or Firm* — Bayramoglu Law Offices LLC

(57) ABSTRACT

Provided are a multi-dimensional fish school perception method and system, and an electronic device. The multi-dimensional fish school perception method includes: acquiring a multi-view optical image and original sonar data of a fish school by using the multi-dimensional fish school perception apparatus; obtaining a first 3D (three-dimensional) feature map of the fish school based on the multi-view optical image; obtaining a second 3D feature map of the fish school based on the original sonar data; extracting fused features based on the first 3D feature map and the second 3D feature map to obtain a fused feature map; and obtaining, based on the fused feature map, a 3D detection result of a target fish school by using a self-attention-mechanism-based 3D target detection method.

13 Claims, 9 Drawing Sheets

Figure 6:
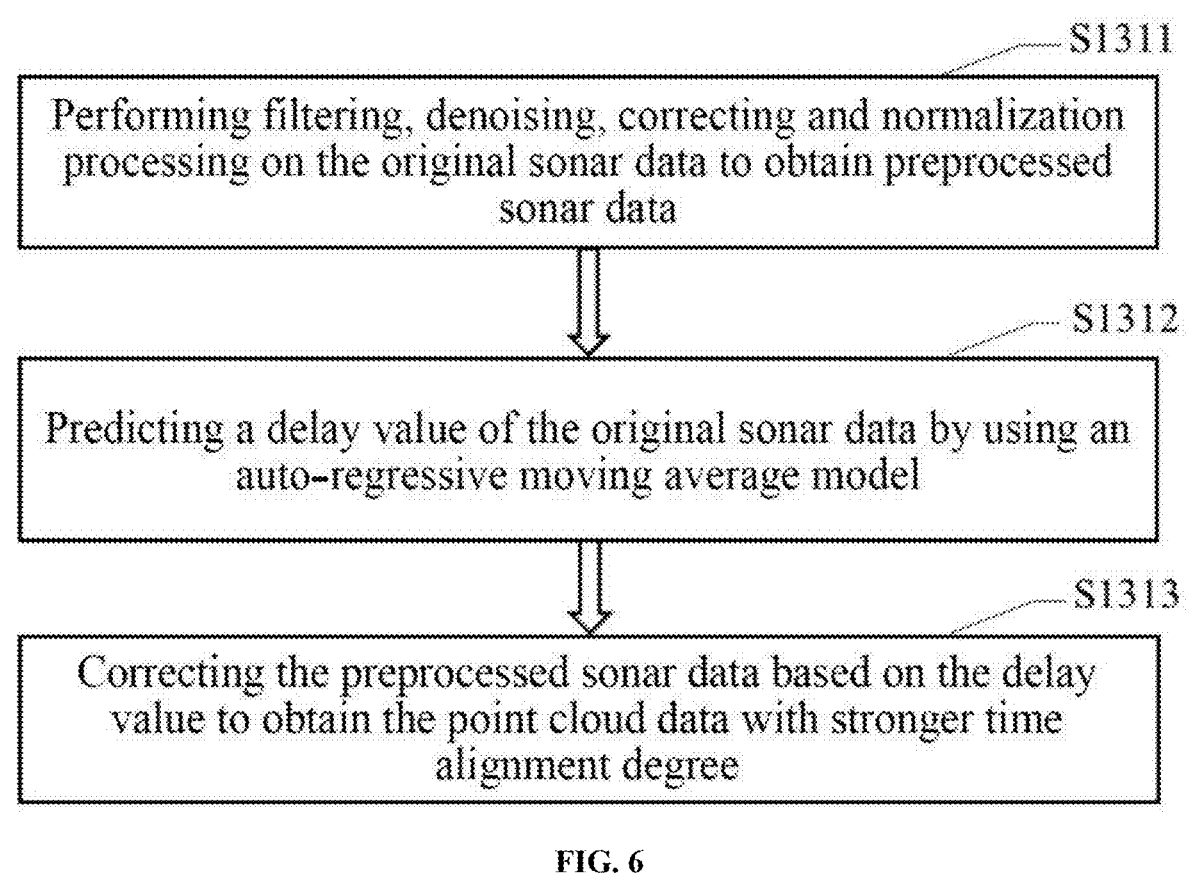

S1311

Performing filtering, denoising, correcting and normalization processing on the original sonar data to obtain preprocessed sonar data

S1312

Predicting a delay value of the original sonar data by using an auto-regressive moving average model

S1313

Correcting the preprocessed sonar data based on the delay value to obtain the point cloud data with stronger time alignment degree

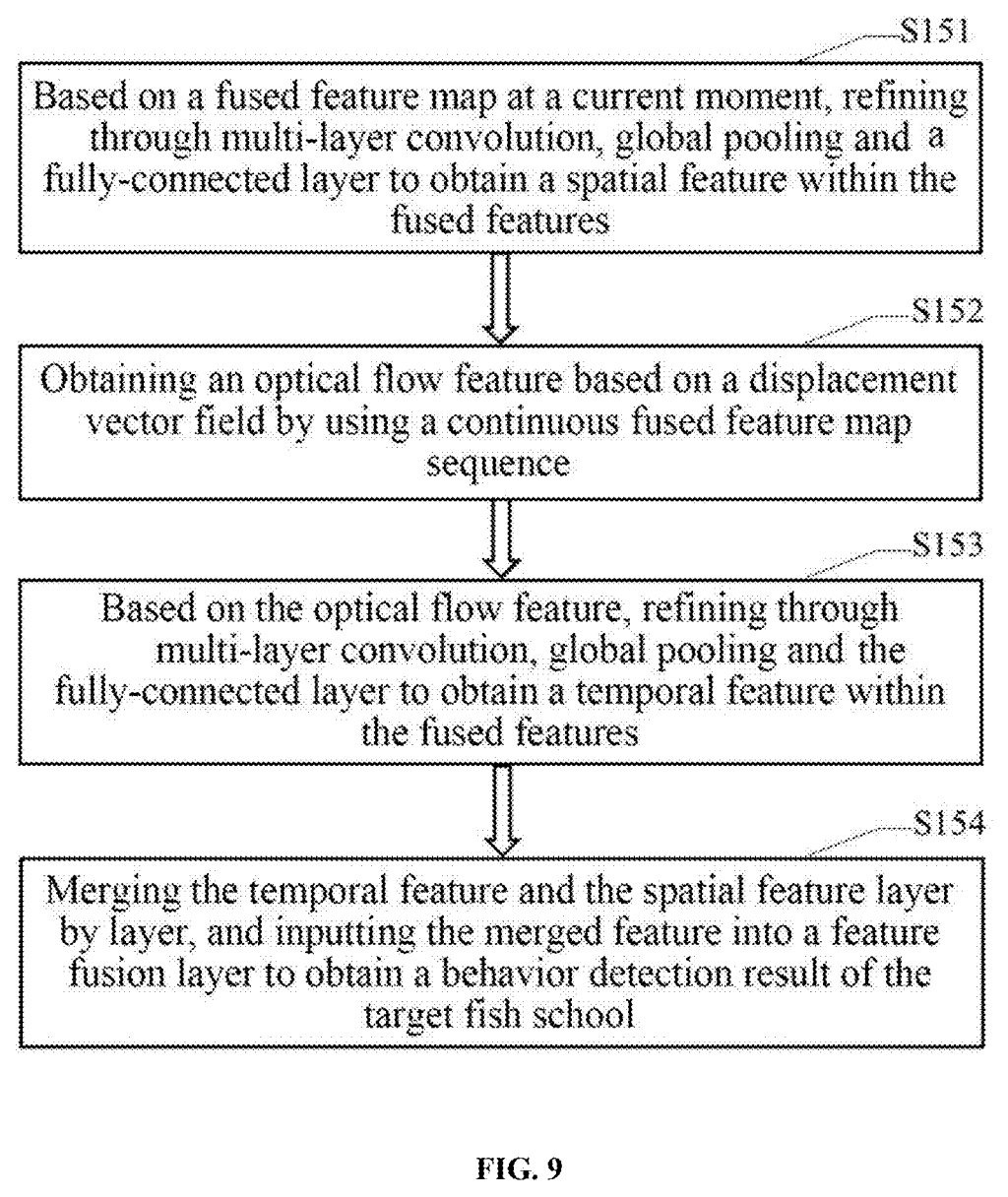

Based on a fused feature map at a current moment, refining through multi-layer convolution, global pooling and a fully-connected layer to obtain a spatial feature within the fused features

S152

Obtaining an optical flow feature based on a displacement vector field by using a continuous fused feature map sequence

S153

Based on the optical flow feature, refining through multi-layer convolution, global pooling and the fully-connected layer to obtain a temporal feature within the fused features

S154

Merging the temporal feature and the spatial feature layer by layer, and inputting the merged feature into a feature fusion layer to obtain a behavior detection result of the target fish school

FIG. 9

MULTI-DIMENSIONAL FISH SCHOOL PERCEPTION APPARATUS AND METHOD

CROSS-REFERENCE TO THE RELATED APPLICATIONS

This application is based upon and claims priority to Chinese Patent Application No. 202510056504.3, filed on Jan. 14, 2025, the entire contents of which are incorporated herein by reference.

TECHNICAL FIELD

The present disclosure relates to the technical field of fish school perception, and in particular to a multi-dimensional fish school perception apparatus and method.

BACKGROUND

Fish school perception is an important means for the development and protection of marine living resources, which includes key technical elements such as fish school detection, positioning, counting, tracking and behavior recognition. The traditional fish school perception technology is mostly based on underwater sonar. An underwater sonar sensor has strong penetration ability and long measuring distance, but it has low resolution, a high time delay and is sensitive to environmental noise. In recent years, with the development of computer vision technologies, optical sensors show excellent perception ability. However, in underwater application, the optical sensors are significantly affected by absorption, refraction and scattering effects of water, and has a short perception distance. Therefore, an effective approach for integrating sonar and optical sensors is urgently needed to achieve multi-dimensional element perception of fish schools.

SUMMARY

(1) Technical Problem to be Solved

To solve the technical problem of fish school perception in the prior art, an embodiment of the present disclosure provides a multi-dimensional fish school perception apparatus and method. The apparatus includes multiple pan-tilt cameras and an omnidirectional scanning sonar. The camera can actively rotate to improve global perception accuracy or region-of-interest perception accuracy, achieving complementary advantages between sonar and optical vision to acquire multidimensional information of a fish school such as a spatial position, population size, a movement path, and a high-level behavioral classification. The apparatus and method provided by the present disclosure can be flexibly deployed in various underwater robots to monitor fish resources.

(2) Technical Solution

For the foregoing technical problem, embodiments of the present disclosure provides a multi-dimensional fish school perception apparatus and method.

According to a first aspect of the present disclosure, a multi-dimensional fish school perception apparatus is provided, including a fixed workbench, multiple pan-tilt cameras, and an omnidirectional scanning sonar. The omnidirectional scanning sonar is located at a central position of the fixed workbench and configured to acquire point cloud information in a 360-degree range around the apparatus. The multiple pan-tilt cameras are uniformly distributed on the fixed workbench, and have a same distance from the central position. The pan-tilt cameras can rotate with one degree of freedom in a horizontal direction; and the pan-tilt cameras can actively rotate according to distribution of optical image feature points in an environment.

According to a second aspect of the present disclosure, a multi-dimensional fish school perception method is provided, including: acquiring a multi-view optical image and original sonar data of a fish school by using the foregoing multi-dimensional fish school perception apparatus; obtaining a first 3D (three-dimensional) feature map of the fish school based on the multi-view optical image; obtaining a second 3D feature map of the fish school based on the original sonar data; extracting fused features based on the first 3D feature map and the second 3D feature map to obtain a fused feature map; and obtaining, based on the fused feature map, a 3D detection result of a target fish school by using a self-attention-mechanism-based 3D target detection method.

In some example embodiments, acquiring the multi-view optical image and the original sonar data of the fish school includes: performing collection of the multi-view optical image and the original sonar data in an underwater environment by using an underwater robot equipped with the foregoing multi-dimensional fish school perception apparatus to acquire the multi-view optical image and the original sonar data.

In some example embodiments, obtaining the first 3D feature map of the fish school based on the multi-view optical image includes: inputting the multi-view optical image into a first convolutional neural network to obtain feature codes of the multi-view optical image; obtaining, based on the feature codes, a fused 2D (two-dimensional) feature by using an adaptive-feature-pyramid-based multi-scale feature fusion method; and based on the 2D feature and information of intrinsic parameters and dynamic extrinsic parameters of the plurality of pan-tilt cameras, using a spatial projection method to complete depth prediction and obtain the first 3D feature map.

In some example embodiments, obtaining the second 3D feature map of the fish school based on the original sonar data includes: correcting the original sonar data to obtain point cloud data with strengthened time alignment degree; performing voxel transformation on the point cloud data to obtain voxel data; and obtaining, based on the voxel data, the second 3D feature map by using a sparse 3D convolutional neural network.

In some example embodiments, correcting the original sonar data to obtain the point cloud data with strengthened time alignment degree includes: performing filtering, denoising, correcting and normalization processing on the original sonar data to obtain preprocessed sonar data; predicting a delay value of the original sonar data by using an auto-regressive moving average model; and correcting the preprocessed sonar data based on the delay value to obtain the point cloud data with the strengthened time alignment degree.

In some example embodiments, extracting fused features based on the first 3D feature map and the second 3D feature map includes: cascading data of the first 3D feature map and the second 3D feature map according to channels, and further extracting the fused feature by using a second convolutional neural network.

In some example embodiments, obtaining, based on the fused feature map, the 3D detection result of the target fish school by using the self-attention-mechanism-based 3D target detection method includes: based on a fused feature map at a current moment, refining through multi-layer convolution, global pooling and a fully-connected layer to obtain a spatial feature within the fused features; obtaining an optical flow feature based on a displacement vector field by using a continuous fused feature map sequence; based on the optical flow feature, refining through multi-layer convolution, global pooling and the fully-connected layer to obtain a temporal feature within the fused features; and merging the temporal feature and the spatial feature layer by layer, and inputting the merged feature into a feature fusion layer to obtain a behavior detection result of the target fish school. The spatial feature comprises a relative position of the fish school and scenario information; and the temporal feature comprises position changes of the fish school at different moments, which is used to reflect movement information of the fish school.

According to a third aspect of the present disclosure, a multi-dimensional fish school perception system is provided, including: an acquisition module, configured to acquire a multi-view optical image and original sonar data of a fish school by using the foregoing multi-dimensional fish school perception apparatus; a first feature extraction module, configured to obtain a first 3D feature map of the fish school based on the multi-view optical image; a second feature extraction module, configured to obtain a second 3D feature map of the fish school based on the original sonar data; a feature fusion module, configured to extract fused features based on the first 3D feature map and the second 3D feature map to obtain a fused feature map; and a result detection module, configured to obtain, based on the fused feature map, a 3D detection result of a target fish school by using a self-attention-mechanism-based 3D target detection method.

According to a fourth aspect of the present disclosure, an electronic device is provided, including: a memory, a processor, and a computer program stored on the memory and executable on the processor, where the processor, when executing the computer program, is configured to implement the foregoing method.

According to a fifth aspect of the present disclosure, a storage medium is provided, where a computer-readable instruction is stored in a storage medium, the computer readable instruction, when executed by one or more processors, enables one or more processors to execute the foregoing method.

(3) Beneficial Effects

As can be seen from the foregoing technical solutions, the multi-dimensional fish school perception apparatus and method provided by embodiments of the present disclosure at least have the following beneficial effects.

(1) The perception apparatus includes multiple pan-tilt cameras and an omnidirectional scanning sonar, where the cameras can actively rotate to improve global perception accuracy or region-of-interest perception accuracy. The perception method, based on a fusion frame of optical image data and sonar point cloud data, is divided into a vision branch, a sonar branch and a fusion branch, which can complete fusion of optical and sonar features and three-dimensional target detection of the fish school.

(2) The optical image data are from the pan-tilt camera, and information of intrinsic parameters and dynamic extrinsic parameters of the cameras is explicitly considered in the model. Delay correction is performed on the sonar point cloud data by using an auto-regressive moving average model to improve the time alignment degree.

(3) A sonar data delay correction method based on the auto-regressive moving model is provided. To identify a behavior of the fish school, a temporal-spatial dual-stream identification network is designed on the basis of a data fusion frame, which can achieve complementary advantages between sonar and optical vision to acquire multidimensional information of a fish school such as a spatial position, population size, a movement path, and a high-level behavioral classification.

(4) The apparatus and method provided by the present disclosure can be flexibly deployed in various underwater robots to monitor fish resources.

BRIEF DESCRIPTION OF THE DRAWINGS

The foregoing contents and other objectives, features and advantages of the present disclosure will be more clearly from the following description of embodiments of the present disclosure with reference to the accompanying drawings. In the drawings:

FIG. 6 illustratively shows a flowchart for correcting original sonar data according to an embodiment of the present disclosure;

FIG. 9 illustratively shows a flowchart of obtaining, based on the fused feature map, a behavior detection result of a target fish school by using a self-attention-mechanism-based 3D target detection method according to an embodiment of the present disclosure;

REFERENCE NUMERALS

1—workbench; 2—pan-tilt camera; 3—omnidirectional scanning sonar.

DETAILED DESCRIPTION OF THE EMBODIMENTS

In order to make objectives, technical solutions and advantages of the present disclosure more clearly, the present disclosure is further described in detail below in conjunction with specific embodiments and with reference to accompanying drawings. Apparently, the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

Figure 1:
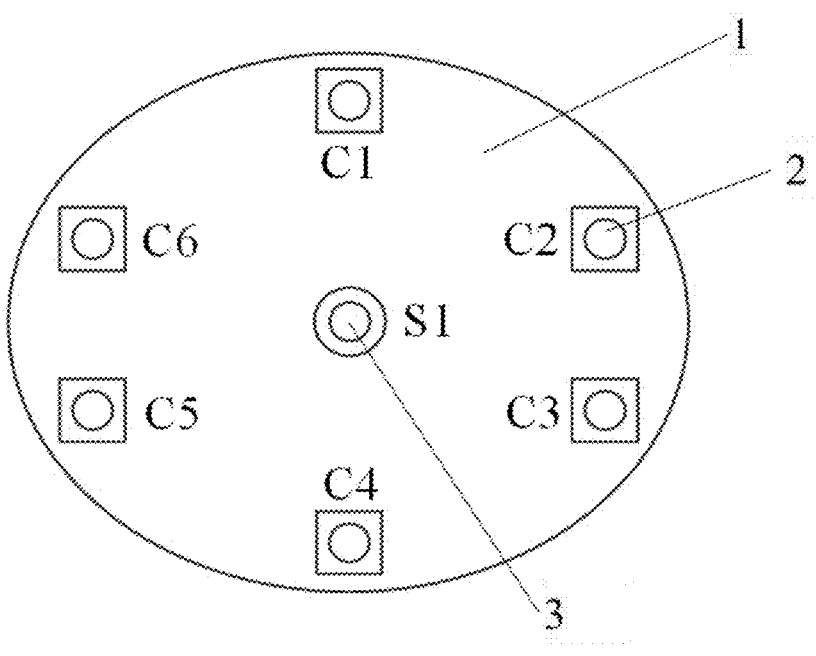
FIG. 1 illustratively shows a diagram of a structure of a multi-dimensional fish school perception apparatus according to an embodiment of the present disclosure.

FIG. 1 illustratively shows a diagram of a structure of a multi-dimensional fish school perception apparatus according to an embodiment of the present disclosure.

As shown in FIG. 1, a multi-dimensional fish school perception apparatus according to an embodiment of the present disclosure includes a fixed workbench 1, an omnidirectional scanning sonar 3, and multiple pan-tilt cameras 2. The omnidirectional scanning sonar 3 is located at a central position of the fixed workbench 1 and configured to acquire point cloud information in a 360-degree range around the apparatus. The multiple pan-tilt cameras 2 are uniformly distributed on the fixed workbench 1, and have a same distance from the central position. The pan-tilt cameras 2 can rotate with one degree of freedom in a horizontal direction; and the pan-tilt cameras 2 can actively rotate according to distribution of optical image feature points in an environment, thereby improving overall positioning accuracy or region-of-interest accuracy. In FIG. 1, the number of the pan-tilt cameras 2 is six. It may be understood that the number of the pan-tilt cameras 2 is not limited to six, which can be designed according to specific demands.

The apparatus according to an embodiment of the present disclosure can be fastened to an underground robot to form a perception system thereof.

Figure 2:
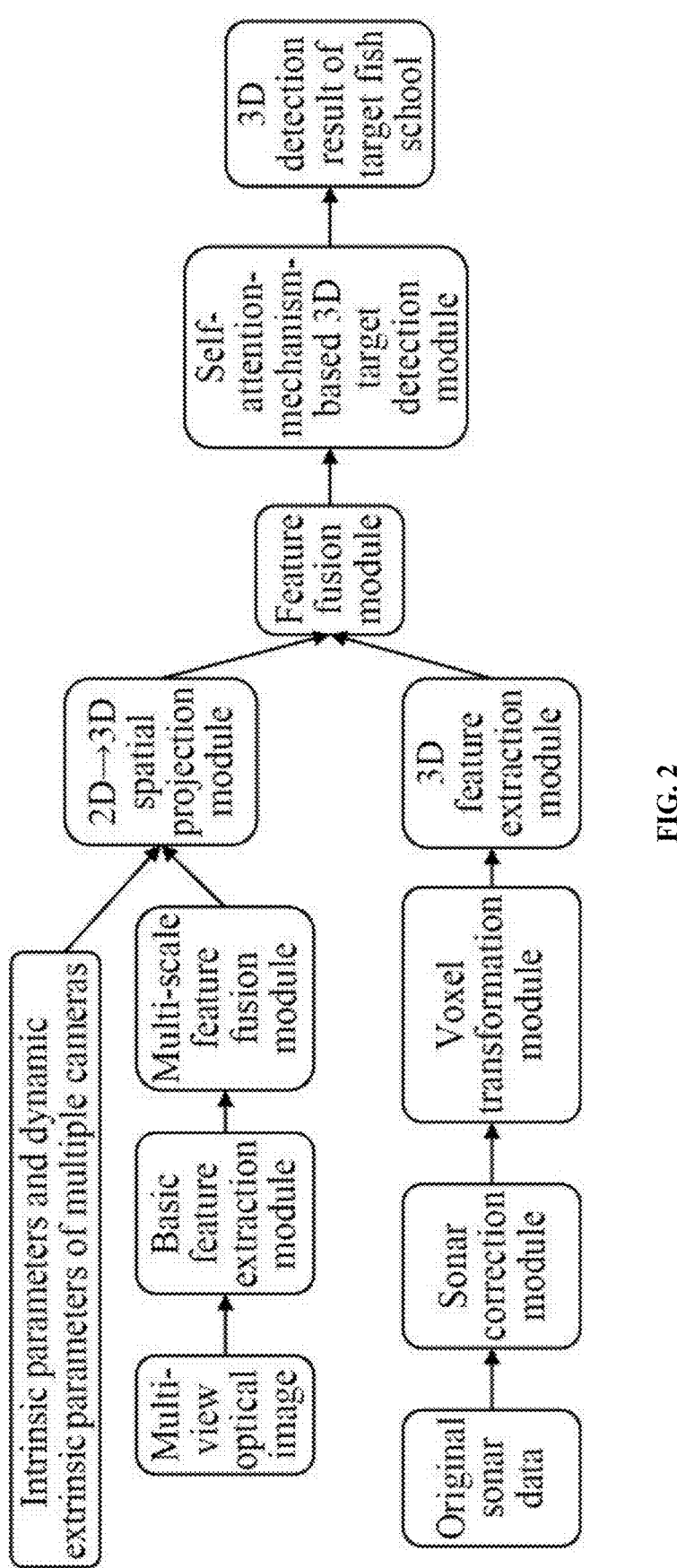
FIG. 2 illustratively shows a diagram of a fusion frame of optical image data and sonar point cloud data according to an embodiment of the present disclosure.

FIG. 2 illustratively shows a diagram of a fusion frame of optical image data and sonar point cloud data according to an embodiment of the present disclosure.

As shown in FIG. 2, a fusion frame of optical image data and sonar point cloud data according to an embodiment of the present disclosure is divided into a vision branch, a sonar branch, and a fusion branch. In the vision branch, a multi-view optical image collected by the pan-tilt camera 2 is firstly input into a basic feature extraction module composed of a convolutional neural network to complete initial feature encoding, and then is input into an adaptive-feature-pyramid-based multi-scale feature fusion module. The fused 2D feature and intrinsic parameter and dynamic extrinsic parameter information of multiple cameras are input into a 2D→3D spatial projection module together to complete depth prediction, thereby obtaining a 3D feature map of the vision branch. In the sonar branch, the original sonar data acquired by the omnidirectional scanning sonar 3 are firstly input into a sonar correction module to optimize data delay to obtain point cloud data with strengthened time alignment degree. Then, the sonar point cloud data are input into a voxel transformation module to obtain voxel data, thereby reducing complexity of the data in a vertical direction. The voxel data are further input into a sparse-3D-convolution-based 3D feature extraction module to obtain a 3D feature map of the sonar branch. The fusion branch receives 3D feature information from the vision branch and the sonar branch, and cascades the data of the two branches according to channels, then a convolution-based feature fusion module is configured to further extract fused features, the fused features are further input into a self-attention-mechanism-based 3D target detection module, and weights of sonar and vision features are dynamically adjusted according to a current environment to finally obtain a 3D detection result of a target fish school.

Based on the apparatus shown in FIG. 1 and a frame shown in FIG. 2, a multi-dimensional fish school perception method provided by the present disclosure is described with reference to FIG. 3 to FIG. 9.

Figure 3:
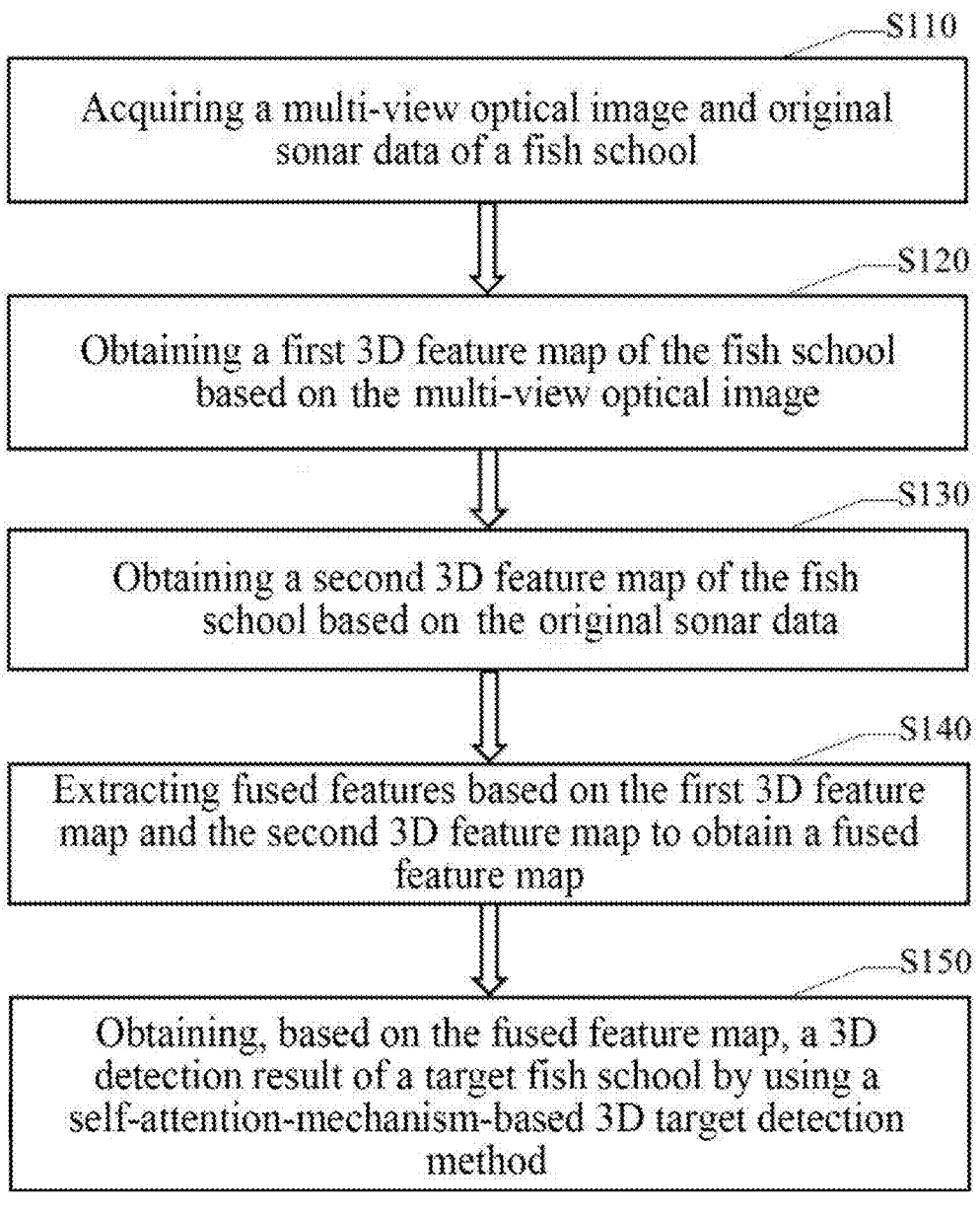
FIG. 3 illustratively shows a flowchart of a multi-dimensional fish school perception method according to an embodiment of the present disclosure.

FIG. 3 illustratively shows a flowchart of a multi-dimensional fish school perception method according to an embodiment of the present disclosure.

As shown in FIG. 3, a multi-dimensional fish school perception method according to an embodiment of the present disclosure includes steps S110-S150.

In step S110, a multi-view optical image and original sonar data of a fish school are acquired.

In some example embodiments, an underwater robot equipped with the apparatus shown in FIG. 1 is used to perform collection of the multi-view optical image and the original sonar data in an underwater environment to acquire the multi-view optical image and the original sonar data.

In step S120, a first 3D feature map of the fish school is obtained based on the multi-view optical image.

Figure 4:
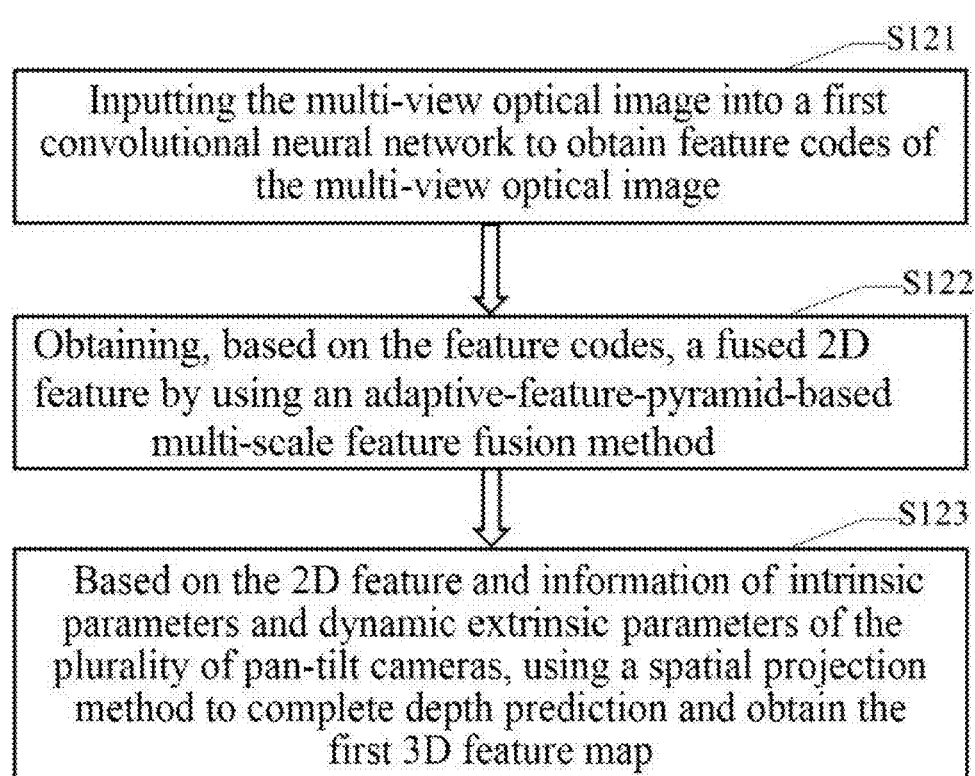
FIG. 4 illustratively shows a flowchart of obtaining a first 3D feature map of a fish school based on a multi-view optical image according to an embodiment of the present disclosure.

In some example embodiments, step S120 includes steps S121 to S123, referring to FIG. 4.

In step S121, the multi-view optical image is input into a first convolutional neural network to obtain feature codes of the multi-view optical image.

In step S122, a fused 2D feature is obtained based on the feature codes by using an adaptive-feature-pyramid-based multi-scale feature fusion method.

In step S123, based on the 2D feature and information of intrinsic parameters and dynamic extrinsic parameters of the multiple pan-tilt cameras, a spatial projection method is used to complete depth prediction and obtain the first 3D feature map. The first 3D feature map corresponds to the 3D feature map of the optical branch in FIG. 2.

In step S130, a second 3D feature map of the fish school is obtained based on the original sonar data.

Figure 5:
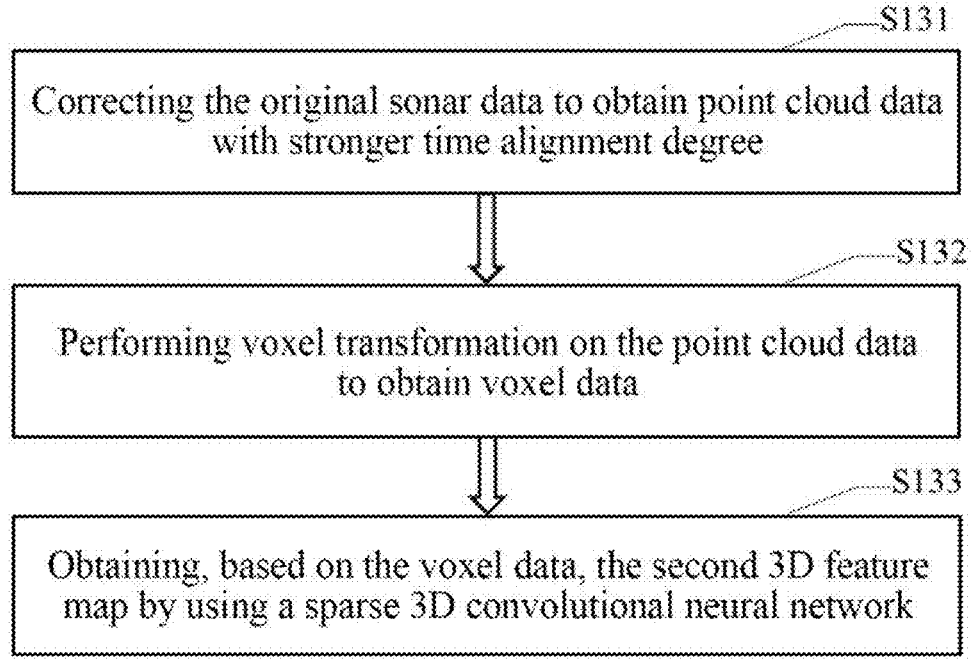
FIG. 5 illustratively shows a flowchart of obtaining a second 3D feature map of a fish school based on original sonar data according to an embodiment of the present disclosure.

In some example embodiments, step S130 includes steps S131 to S133, referring to FIG. 5.

In step S131, the original sonar data are corrected to obtain point cloud data with strengthened time alignment degree.

Data delay in the sonar sensor is a key factor weakening the fusion effect of sonar and vision data. According to the embodiment of the present disclosure, real-time correction of the sonar data are implemented by a sonar data delay prediction algorithm based on historical data and current environmental information.

In some example embodiments, step S131 includes steps S1311 to S1313, referring to FIG. 6.

In step S1311, the original sonar data are filtered, denoised, corrected and normalized to obtain preprocessed sonar data.

In step S1312, a delay value of the original sonar data are predicted by using an auto-regressive moving average model.

In an embodiment of the present disclosure, the auto-regressive moving average (ARMA) model is as follows:

$$AR(p): X_t = c + \sum\nolimits_{i=1}^{p} \phi_i X_{t-i} + \epsilon_t, \tag{1}$$

7

-continued $$MA(q): X_t = \mu + \epsilon_t + \sum_{j=1}^{q} \theta_j \epsilon_{t-j}. \quad (2)$$

Where $X_t$ is a value of a time sequence at a moment t, c is a constant item, $\phi_i$ is an auto-regressive coefficient corresponding to the $i^{th}$ value, $\theta_j$ is a moving average coefficient corresponding to the $j^{th}$ order, $\epsilon_t$ is white noise at the moment t, $\mu$ is a mean of the sequence, and p and q are orders of auto-regressive and moving average, respectively.

In step S1313, the preprocessed sonar data are corrected based on the delay value to obtain point cloud data with strengthened time alignment degree.

In an embodiment of the present disclosure, the sonar data sequence is input into formula (1) and formula (2) for real-time correction, where a correction formula is as follows:

$$Z_t = Y_t - X_t \quad (3).$$

Where $X_t$ is a predicted sonar data delay value, $Y_t$ is an actually observed sonar data value at the moment t, and $Z_t$ is a corrected sonar data value at the moment t.

Figure 7:
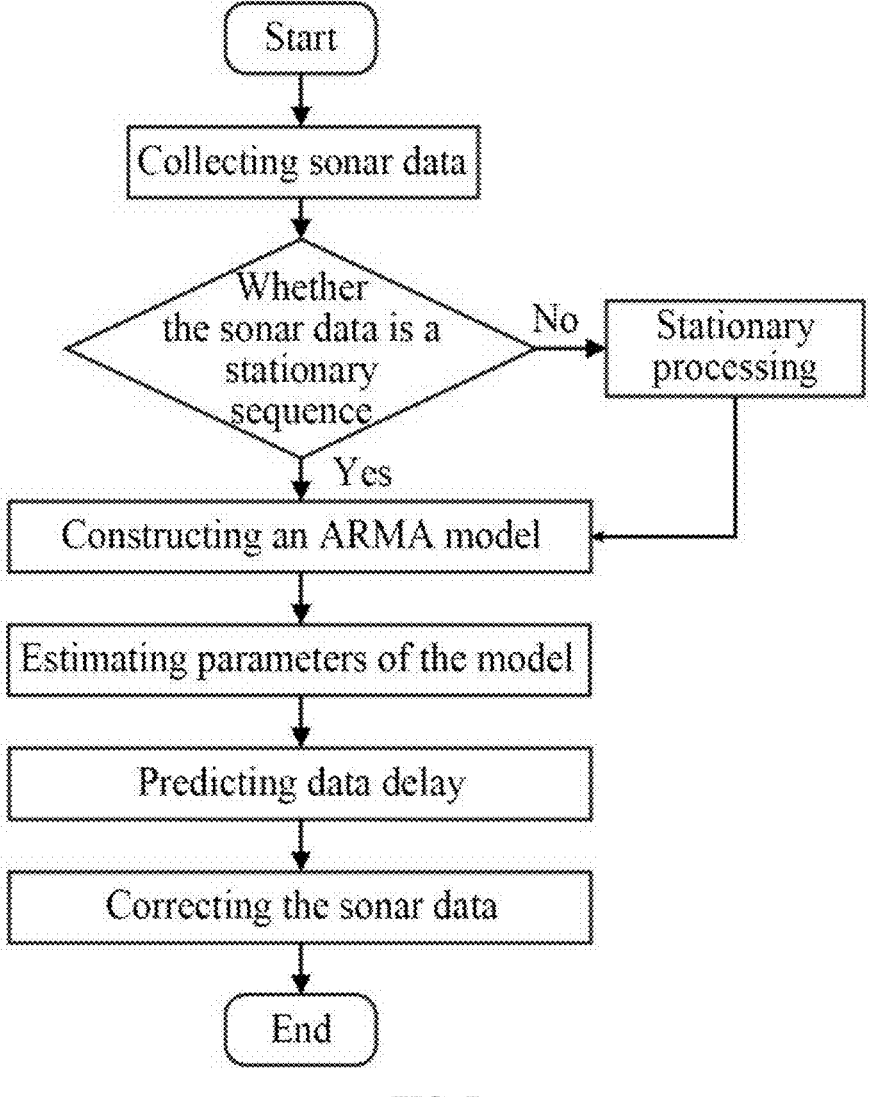
FIG. 7 illustratively shows a flowchart of a sonar correction module according to an embodiment of the present disclosure.

FIG. 7 illustratively shows a flowchart of a sonar correction module according to an embodiment of the present disclosure.

As shown in FIG. 7, after completing the collection of the original sonar data, the data needs to be subject to stationary sequence determination, and the ARMA model is constructed after the data are stationary, and then model parameter estimation and data prediction are performed, followed by data correction.

In step S132, the point cloud data are subjected to voxel transformation to obtain voxel data.

The point cloud data are a set of discrete points in a three-dimensional space, and are widely used in numerous fields such as three-dimensional modeling, automatic driving, and virtual reality. However, discreteness and large-scale of the point cloud data make direct processing more complicated and inefficient. Voxel, as a representation for discretizing the three-dimensional space into regular cubes, can simplify data processing to a certain extent and has a unique analytical perspective. Transforming the point cloud data to a voxel structure can provide a convenient basic data form for multiple subsequent applications.

In step S133, the second 3D feature map is obtained by using a sparse 3D convolutional neural network based on the voxel data. The second 3D feature map corresponds to the 3D feature map of the sonar branch in FIG. 2.

In comparison with FIG. 3, in step S140, fused features are extracted based on the first 3D feature map and the second 3D feature map to obtain a fused feature map.

For example, data of the first 3D feature map and the second 3D feature map are cascaded according to channels, and the fused features are further extracted by using a second convolutional neural network.

In step S150, based on the fused feature map, a 3D detection result of a target fish school is obtained by using a self-attention-mechanism-based 3D target detection method.

Figure 8:
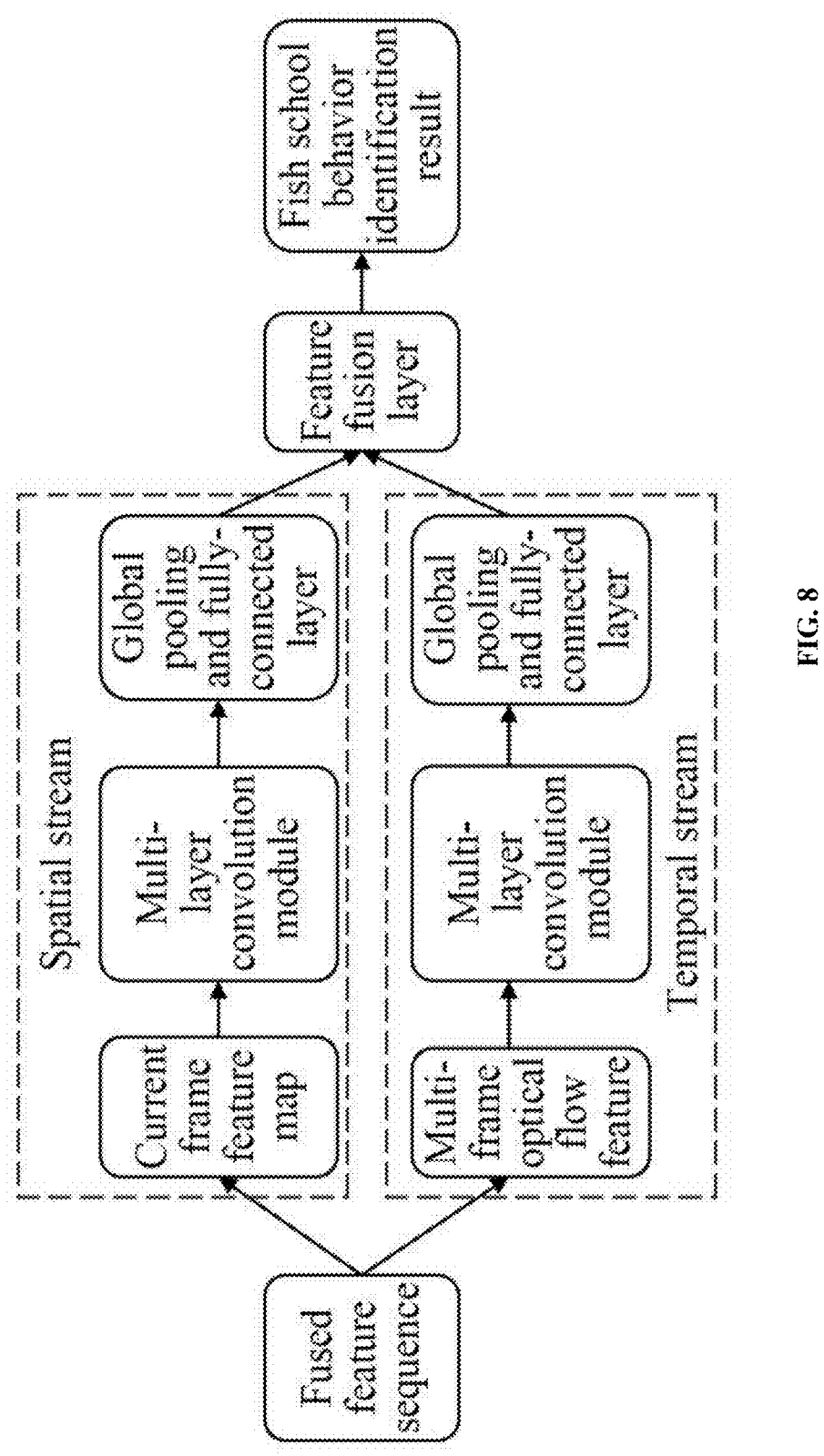
FIG. 8 illustratively shows a diagram of a structure of a temporal-spatial dual-stream fish school behavior network according to an embodiment of the present disclosure.

FIG. 8 illustratively shows a diagram of a structure of a temporal-spatial dual-stream fish school behavior network according to an embodiment of the present disclosure.

As shown in FIG. 8, outputs of a feature fusion module in FIG. 2 at continuous moments are combined into a feature sequence, which is input into a spatial stream branch and a temporal stream branch separately. The spatial stream branch, based on the feature map at a current moment, can obtain a spatial feature within the fused features by refining through multi-layer convolution, global pooling and a fully-connected layer, where the spatial feature focuses on a relative position of the fish school and scenario information. The temporal stream branch obtains an optical flow feature based on a displacement vector field by using a continuous feature sequence, and then the optical flow feature is refined through multi-layer convolution, global pooling and the fully-connected layer to obtain a temporal feature of the fused features, where the temporal feature focuses on position changes of the fish school at different moments, and reflects movement information of the fish school. The temporal feature and the spatial feature are merged layer by layer and input into a feature fusion layer to obtain a behavior detection result of the fish school, thereby determining satiety, activity and health states of the fish.

Based on a temporal-spatial dual-stream fish school behavior network structure shown in FIG. 8, step S150 includes steps S151 to S154, referring to FIG. 9.

In step S151, based on a fused feature map at a current moment, a spatial feature within the fused features is obtained by refining through multi-layer convolution, global pooling and fully-connected layer, where the spatial feature includes a relative position of the fish school, and scenario information.

In step S152, an optical flow feature based on a displacement vector field is obtained by using a continuous fused feature map sequence.

In step S153, based on the optical flow feature, the temporal feature of the fused feature is obtained by refining through multi-layer convolution, global pooling and full connection layer, where the temporal feature includes position changes of the fish school at different moments, and is used to reflect movement information of the fish school.

In step S154, the temporal feature and the spatial feature are merged layer by layer, and input into a feature fusion layer to obtain a 3D detection result of the target fish school.

Figure 10:
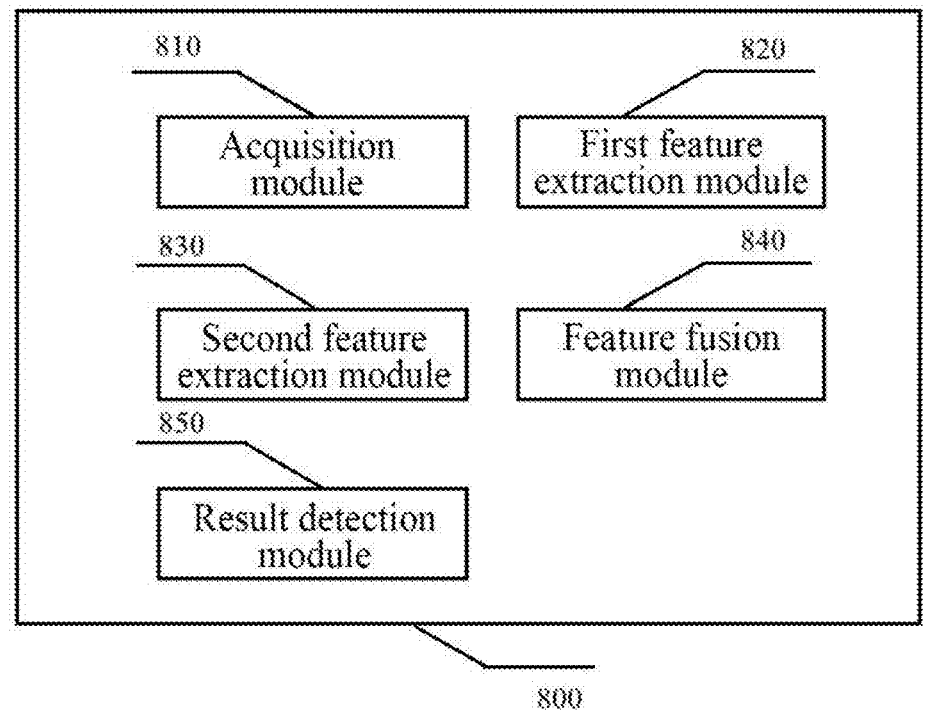
FIG. 10 illustratively shows a structural block diagram of a multi-dimensional fish school perception system according to an embodiment of the present disclosure.

FIG. 10 illustratively shows a block diagram of a structure of a multi-dimensional fish school perception system according to an embodiment of the present disclosure.

As shown in FIG. 10, a multi-dimensional fish school perception system 800 according to an embodiment of the present disclosure includes an acquisition module 810, a first feature extraction module 820, a second feature extraction module 830, a feature fusion module 840, and a result detection module 850.

The acquisition module 810 is configured to acquire a multi-view optical image and original sonar data of a fish school by using the multi-dimensional fish school perception apparatus shown in FIG. 1.

The first feature extraction module 820 is configured to obtain a first 3D feature map of the fish school based on the multi-view optical image.

The second feature extraction module 830 is configured to obtain a second 3D feature map of the fish school based on the original sonar data.

The feature fusion module 840 is configured to extract fused features based on the first 3D feature map and the second 3D feature map to obtain a fused feature map.

The result detection module 850 is configured to obtain, based on the fused feature map, a 3D detection result of a target fish school by using a self-attention-mechanism-based 3D target detection method.

In some specific embodiments, any multiple modules of the acquisition module 810, the first feature extraction module 820, the second feature extraction module 830, the feature fusion module 840 and the result detection module 850 can be merged and implemented in one module, or any one of them can be split into multiple modules. Alternatively, at least some functions of one or more of these modules can be combined with at least some functions of other modules and implemented in one module.

In some specific embodiments, at least one of the acquisition module 810, the first feature extraction module 820, the second feature extraction module 830, the feature fusion module 840 and the result detection module 850 can be at least partially implemented as a hardware circuit, such as a field programmable gate array (FPGA), a programmable logic array (PLA), an on-chip system, a system on a substrate, a system on a package, and an application specific integrated circuit (ASIC), or can be implemented by hardware or firmware such as any other reasonable way to integrate or encapsulate the circuit, or can be implemented in any one of software, hardware and firmware, or in an appropriate combination of any of them. Alternatively, at least one of the acquisition module 810, the first feature extraction module 820, the second feature extraction module 830, the feature fusion module 840 and the result detection module 850 can be at least partially implemented as a computer program module. The computer program module, when executed, can execute a corresponding function.

Figure 11:
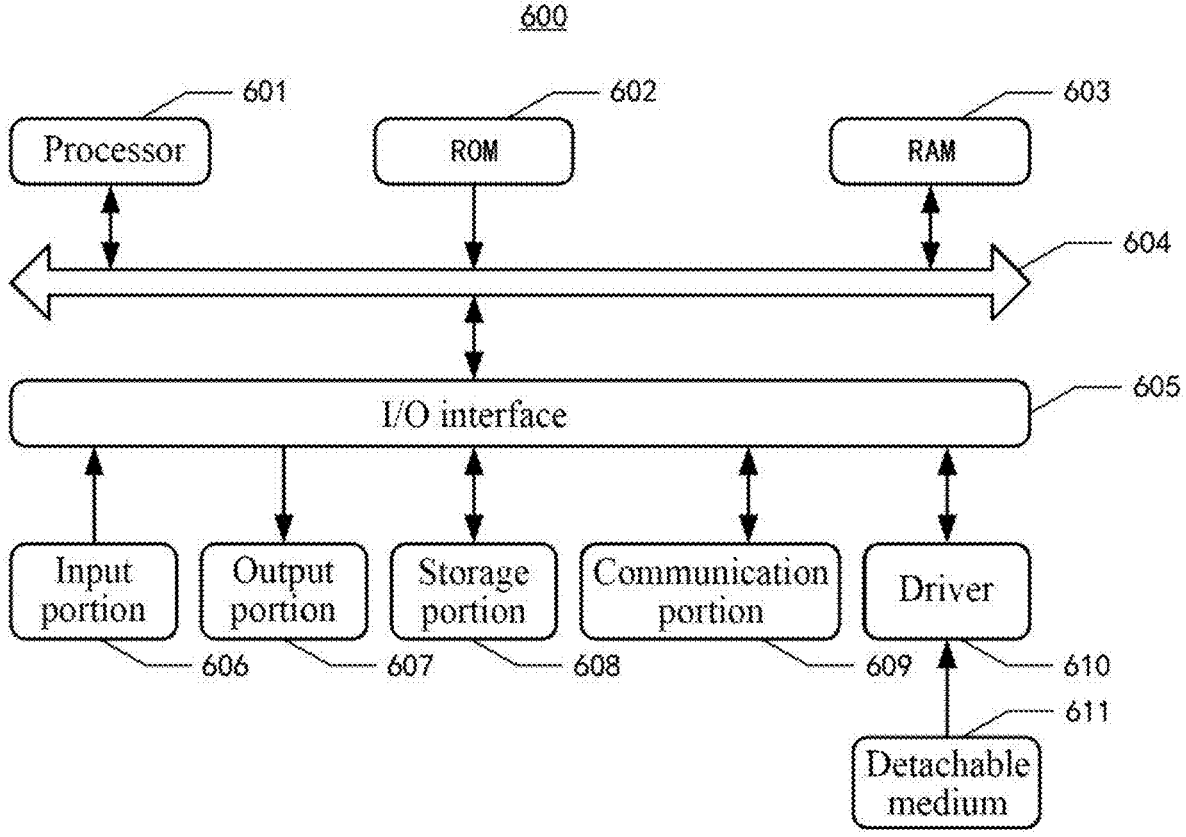
FIG. 11 illustratively shows a block diagram of an electric device for a multi-dimensional fish school perception method according to an embodiment of the present disclosure.

FIG. 11 illustratively shows a block diagram of an electronic device for a multi-dimensional fish school perception method according to an embodiment of the present disclosure.

As shown in FIG. 11, the electronic device 600 according to an embodiment of the present disclosure includes a processor 601, which can execute various appropriate actions and processing according to a program stored in a read only memory (ROM) 602, or a program loaded into a random-access memory (RAM) 603 from a storage portion 608. The processor 601, for example, may include a general-purpose microprocessor (such as a CPU (central processing unit)), an instruction set processor and/or a related chipset and/or a dedicated microprocessor (such as an application specific integrated circuit). The processor 601 may further include an on-board memory for caching purposes. The processor 601 may include a single processing unit or multiple processing units for performing different actions of the method flow according to the embodiment of the present disclosure.

In RAM 603, various programs and data required for the operation of the electronic device 600 are stored. The processor 601, the ROM 602 and the RAM 603 are connected to one another by a bus 604. The processor 601 executes various operations of the method flow according to the embodiment of the present disclosure by executing programs in the ROM 602 and/or RAM 603. It should be noted that the program may also be stored in one or more memories other than ROM 602 and RAM 603. The processor 601 may also execute various operations of the method flow according to the embodiment of the present disclosure by executing programs stored in one or more memories.

In some specific embodiments, the electronic device 600 may further include an input/output (I/O) interface 605, and the input/output (I/O) interface 605 is also connected to the bus 604. The electronic device 600 may further include one or more of the following components connected to the I/O interface 605: an input portion 606 including a keyboard, a mouse and the like; an output portion 607 including a cathode ray tube (CRT), a liquid crystal display (LCD) and a speaker; a storage portion 608 including a hard disk or the like; and a communication portion 609 including a network interface card such as a LAN (local area network) card, a modem, and the like. The communication portion 609 performs communication processing via a network such as the Internet. The driver 610 may also be connected to the I/O interface 605 as required. A detachable medium 611, such as a magnetic disk, an optical disk, a magneto-optical disk, and a semiconductor memory, is installed on a driver 610 as required, so that a computer program read from the detachable medium can be installed into the storage portion 608 as required.

An embodiment of the present disclosure illustrates a computer-readable storage medium. The computer-readable medium may be included in a device/apparatus/system described in the foregoing embodiment, or exist alone without being assembled into the device/apparatus/system. The computer-readable storage medium carries one or more programs, which, when executed, are configured to implement the method according to the embodiments of the present disclosure.

In some specific embodiments, the computer-readable storage medium may be a non-volatile computer-readable storage medium, for example, it may include, but not limited to, a portable computer disk, a hard disk, a random-access memory (RAM), a read only memory (ROM), an erasable programmable read-only memory (EPROM or flash memory), a portable compact disk read-only memory (CD-ROM), an optical storage device, a magnetic storage device, or any suitable combination of the above. In the present disclosure, the computer-readable storage medium may be any tangible medium including or storing a program, which can be used by or in combination with an instruction execution system, apparatus or device. For example, according to an embodiment of the present disclosure, the computer-readable storage medium may include one or more memories other than ROM 602 and/or RAM 603 and/or ROM 602 and RAM 603 described above.

An embodiment of the present disclosure illustrates a computer program product, which includes a computer program, and the computer program includes a program code for executing the method shown in the flowchart. When the computer program product runs in the computer system, the program code is used to enable the computer system to implement the method provided by the embodiment of the present disclosure.

The computer program, when executed by the processor 601, is configured to execute the foregoing functions defined in the system/apparatus of the embodiment of the present disclosure. According to the embodiments of the present disclosure, the system, the apparatus, the module and the unit described above are implemented through a computer program module.

In some specific embodiments, the computer program can rely on tangible storage media such as an optical storage device and a magnetic storage device. In another embodiment, the computer program may be transmitted and distributed in the form of a signal on a network medium, and downloaded and installed by the communication portion 609 from the network, or installed from the detachable medium 611. The program code included in the computer program can be transmitted using any appropriate network medium, which includes, but is not limited to: wireless and wired network medium, or any suitable combination of the above.

In some specific embodiments, the computer program may be downloaded and installed by the communication portion 609 from the network, and/or installed from the detachable medium 611. The computer program, when executed by the processor 601, is configured to execute the foregoing functions defined in the system according to the embodiment of the present disclosure. According to the embodiments of the present disclosure, the system, the device, the apparatus, the module and the unit described above can be implemented through a computer program module.

In some specific embodiments, the program code for executing the computer program provided by the embodiment of the present disclosure can be compiled in any combination of one or more programming languages. Specifically, these calculation programs can be implemented by using high-level procedural and/or object-oriented programming languages and/or assembly/machine languages. The programming languages include, but are not limited to, Java, C++, python, "C" language or similar programming languages. The program code can be completely executed on user equipment, partially executed on the user equipment, partially executed on a remote computing device, or completely executed on a remote computing device or server. In the case of involving the remote computing device, the remote computing device can be connected to a user computing device through any network, including a local area network (LAN) or a wide area network (WAN), or can be connected to an external computing device (for example, by using Internet connection provided by an Internet service provider).

The flowcharts and block diagrams in the drawings illustrate the architecture, functions and operations of possible implementations of systems, methods and computer program products according to various embodiments of the present disclosure. In this regard, each block in the flowchart or block diagram may represent a module, a program segment, or a part of code that contains one or more executable instructions for implementing specified logical functions. It should also be noted that in some alternative implementations, the functions noted in the blocks may occur in a different order than those noted in the drawings. For example, two blocks shown in succession can actually be executed substantially in parallel, and they can sometimes be executed in the reverse order, depending on the functions involved. It should also be noted that each block in the block diagrams and/or flowcharts, and combinations of blocks in the block diagrams and/or flowcharts, can be implemented by a dedicated hardware-based system that performs specified functions or operations, or by a combination of dedicated hardware and computer instructions.

The objective, technical solution and beneficial effects of the present disclosure are described in detail with specific embodiments described above. It should be understood that the foregoing embodiments are only specific embodiments of the present disclosure and are not used to limit the present disclosure. Any modification, equivalent substitution, improvement and the like made within the spirit and principle of the present disclosure should be included in the protection scope of the present disclosure.

What is claimed is:

1. A multi-dimensional fish school perception method, comprising:
    acquiring a multi-view optical image and original sonar data of a fish school by using a multi-dimensional fish school perception apparatus;
    obtaining a first three-dimensional (3D) feature map of the fish school based on the multi-view optical image;
    obtaining a second 3D feature map of the fish school based on the original sonar data;
    extracting fused features based on the first 3D feature map and the second 3D feature map to obtain a fused feature map; and obtaining, based on the fused feature map, a 3D detection result of a target fish school by using a self-attention-mechanism-based 3D target detection method;
    wherein obtaining the first 3D feature map of the fish school based on the multi-view optical image comprises:
        inputting the multi-view optical image into a first convolutional neural network to obtain feature codes of the multi-view optical image;
        obtaining, based on the feature codes, a fused two-dimensional (2D) feature by using an adaptive-feature-pyramid-based multi-scale feature fusion method; and
        based on the 2D feature and information of intrinsic parameters and dynamic extrinsic parameters of a plurality of pan-tilt cameras, using a spatial projection method to complete depth prediction and obtain the first 3D feature map;
    wherein the multi-dimensional fish school perception apparatus comprises a fixed workbench, the plurality of pan-tilt cameras, and an omnidirectional scanning sonar,
    wherein the omnidirectional scanning sonar is located at a central position of the fixed workbench and configured to acquire point cloud information in a 360-degree range around the multi-dimensional fish school perception apparatus;
    the plurality of pan-tilt cameras are uniformly distributed on the fixed workbench, and have a same distance from the central position; the plurality of pan-tilt cameras are configured to rotate with one degree of freedom in a horizontal direction; and the plurality of pan-tilt cameras are configured to actively rotate according to distribution of optical image feature points in an environment; and
    the plurality of pan-tilt cameras are configured to acquire the multi-view optical image.

2. The multi-dimensional fish school perception method according to claim 1, wherein acquiring the multi-view optical image and the original sonar data of the fish school comprises: performing collection of the multi-view optical image and the original sonar data in an underwater environment by using an underwater robot equipped with the multi-dimensional fish school perception apparatus to acquire the multi-view optical image and the original sonar data.

3. The multi-dimensional fish school perception method according to claim 1, wherein obtaining the second 3D feature map of the fish school based on the original sonar data comprises:
    correcting the original sonar data to obtain point cloud data with strengthened time alignment degree;
    performing voxel transformation on the point cloud data to obtain voxel data; and
    obtaining, based on the voxel data, the second 3D feature map by using a sparse 3D convolutional neural network.

4. The multi-dimensional fish school perception method according to claim 3, wherein correcting the original sonar data to obtain the point cloud data with the strengthened time alignment degree comprises:
    performing filtering, denoising, correcting and normalization processing on the original sonar data to obtain preprocessed sonar data;
    predicting a delay value of the original sonar data by using an auto-regressive moving average model; and correcting the preprocessed sonar data based on the delay value to obtain the point cloud data with the strengthened time alignment degree.

5. The multi-dimensional fish school perception method according to claim 1, wherein extracting the fused features based on the first 3D feature map and the second 3D feature map comprises: cascading data of the first 3D feature map and the second 3D feature map according to channels, and further extracting the fused features by using a second convolutional neural network.

6. The multi-dimensional fish school perception method according to claim 1, wherein obtaining, based on the fused feature map, the 3D detection result of the target fish school by using the self-attention-mechanism-based 3D target detection method comprises:

based on the fused feature map at a current moment, refining through multi-layer convolution, global pooling and a fully-connected layer to obtain a spatial feature within the fused features;

obtaining an optical flow feature based on a displacement vector field by using a continuous fused feature map sequence;

based on the optical flow feature, refining through multi-layer convolution, global pooling and the fully-connected layer to obtain a temporal feature within the fused features; and merging the temporal feature and the spatial feature layer by layer to obtain a merged feature, and inputting the merged feature into a feature fusion layer to obtain a behavior detection result of the target fish school;

wherein the spatial feature comprises a relative position of the fish school and scenario information; and the temporal feature comprises position changes of the fish school at different moments, and the temporal feature is used to reflect movement information of the fish school.

7. A multi-dimensional fish school perception system, comprising:

an acquisition module, configured to acquire a multi-view optical image and original sonar data of a fish school by using a multi-dimensional fish school perception apparatus;

a first feature extraction module, configured to obtain a first 3D feature map of the fish school based on the multi-view optical image;

a second feature extraction module, configured to obtain a second 3D feature map of the fish school based on the original sonar data;

a feature fusion module, configured to extract fused features based on the first 3D feature map and the second 3D feature map to obtain a fused feature map; and a result detection module, configured to obtain, based on the fused feature map, a 3D detection result of a target fish school by using a self-attention-mechanism-based 3D target detection method;

wherein obtaining the first 3D feature map of the fish school based on the multi-view optical image comprises:

inputting the multi-view optical image into a first convolutional neural network to obtain feature codes of the multi-view optical image;

obtaining, based on the feature codes, a fused 2D feature by using an adaptive-feature-pyramid-based multi-scale feature fusion method; and based on the 2D feature and information of intrinsic parameters and dynamic extrinsic parameters of a plurality of pan-tilt cameras, using a spatial projection method to complete depth prediction and obtain the first 3D feature map;

wherein the multi-dimensional fish school perception apparatus comprises a fixed workbench, the plurality of pan-tilt cameras, and an omnidirectional scanning sonar, wherein the omnidirectional scanning sonar is located at a central position of the fixed workbench and configured to acquire point cloud information in a 360-degree range around the multi-dimensional fish school perception apparatus;

the plurality of pan-tilt cameras are uniformly distributed on the fixed workbench, and have a same distance from the central position; the plurality of pan-tilt cameras are configured to rotate with one degree of freedom in a horizontal direction; and the plurality of pan-tilt cameras are configured to actively rotate according to distribution of optical image feature points in an environment; and the plurality of pan-tilt cameras are configured to acquire the multi-view optical image.

8. An electronic device, comprising: a memory, a processor, and a computer program stored on the memory and executable on the processor, wherein the processor, when executing the computer program, is configured to implement the multi-dimensional fish school perception method according to claim 1.

9. The electronic device according to claim 8, wherein acquiring the multi-view optical image and the original sonar data of the fish school comprises: performing collection of the multi-view optical image and the original sonar data in an underwater environment by using an underwater robot equipped with the multi-dimensional fish school perception apparatus to acquire the multi-view optical image and the original sonar data.

10. The electronic device according to claim 8, wherein obtaining the second 3D feature map of the fish school based on the original sonar data comprises:

correcting the original sonar data to obtain point cloud data with strengthened time alignment degree;

performing voxel transformation on the point cloud data to obtain voxel data; and obtaining, based on the voxel data, the second 3D feature map by using a sparse 3D convolutional neural network.

11. The electronic device according to claim 10, wherein correcting the original sonar data to obtain the point cloud data with the strengthened time alignment degree comprises:

performing filtering, denoising, correcting and normalization processing on the original sonar data to obtain preprocessed sonar data;

predicting a delay value of the original sonar data by using an auto-regressive moving average model; and correcting the preprocessed sonar data based on the delay value to obtain the point cloud data with the strengthened time alignment degree.

12. The electronic device according to claim 8, wherein extracting the fused features based on the first 3D feature map and the second 3D feature map comprises: cascading data of the first 3D feature map and the second 3D feature map according to channels, and further extracting the fused features by using a second convolutional neural network.

13. The electronic device according to claim 8, wherein obtaining, based on the fused feature map, the 3D detection result of the target fish school by using the self-attention-mechanism-based 3D target detection method comprises:

based on the fused feature map at a current moment, refining through multi-layer convolution, global pooling and a fully-connected layer to obtain a spatial feature within the fused features;

obtaining an optical flow feature based on a displacement vector field by using a continuous fused feature map sequence;

based on the optical flow feature, refining through multi-layer convolution, global pooling and the fully-connected layer to obtain a temporal feature within the fused features; and merging the temporal feature and the spatial feature layer by layer to obtain a merged feature, and inputting the merged feature into a feature fusion layer to obtain a behavior detection result of the target fish school;

wherein the spatial feature comprises a relative position of the fish school and scenario information; and the temporal feature comprises position changes of the fish school at different moments, and the temporal feature is used to reflect movement information of the fish school.

* * * * *